Oct. 14, 1952 — L. A. GECSEI — 2,613,453
TRAINING TYPEWRITER
Filed Jan. 15, 1947 — 2 SHEETS—SHEET 1
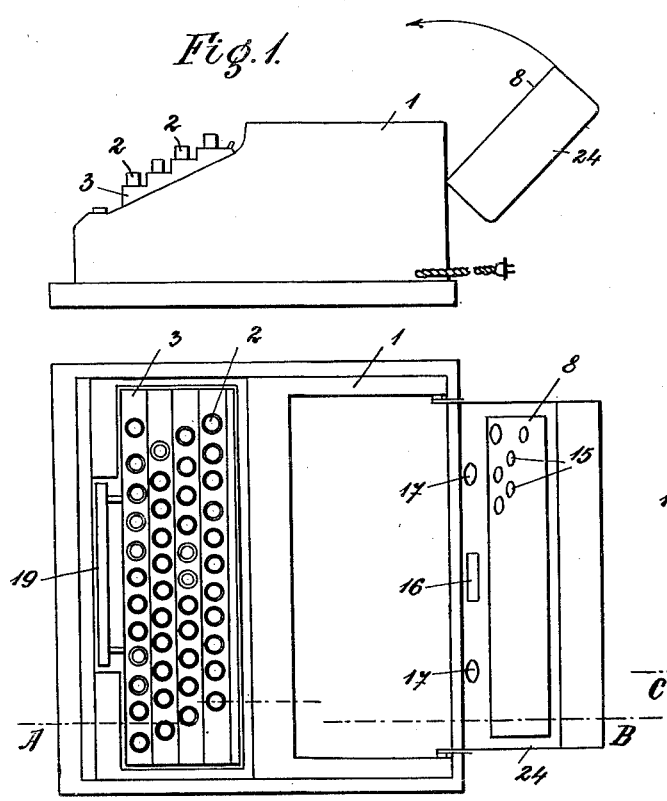
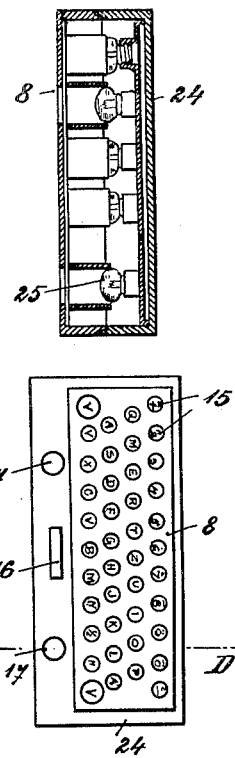
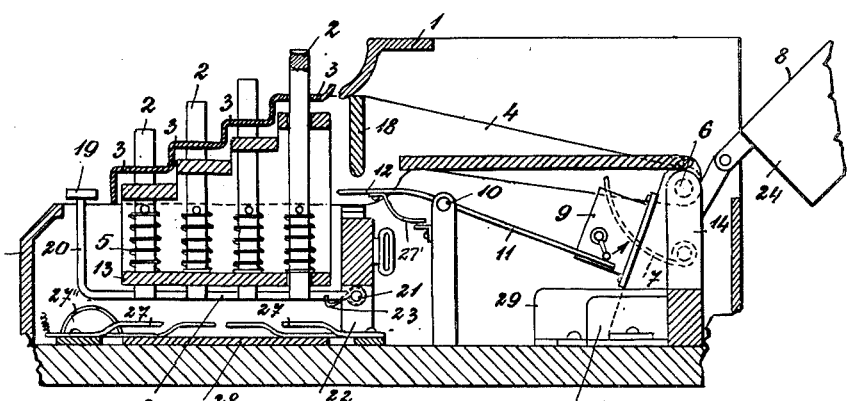

Patented Oct. 14, 1952

2,613,453

UNITED STATES PATENT OFFICE 2,613,453

TRAINING TYPEWRITER

László Andor Gecsei, Sarospatak, Hungary

Application January 15, 1947, Serial No. 722,227
In Hungary March 7, 1946

9 Claims. (Cl. 35—5)

In recent years, special training schools for typists are training their pupils in such a manner, as to ensure, that the typists should, during typing, not be compelled to look at the key-board of the typewriter, but should be able to type without looking at the keyboard, i. e. by so-called "blind typing," thus enabling the typist to concentrate his or her whole attention to the dictate, or, as the case may be, the accurate copying of the text. It is this purpose that is served by the training typewriter according to the invention. The essential characteristics of this device are that a typewriter frame, fashioned so as to resemble the exterior shape of a normal typewriter, is equipped with a key-board fitted with springs, which corresponds to the key-board of a normal typewriter, but on which no letters or signs are provided, and further, with a stepped impact surface which is arranged in the space between the keys and serves for indicating strokes which have gone astray to the right or left of the key which it was intended to strike, and that on the frame, in front of the eyes of the person wishing to learn typewriting, there is provided a sign board, preferably capable of being tilted down and brought into an oblique position, on which sign-board there are provided signs corresponding to the key-board of a typewriter, and further, signs indicating the striking-down of the interval between words, and, finally, signs indicating the going astray of strokes to the right or left of the key which it was intended to strike, which signs are connected with optical and/or acoustical indicating devices, e. g. lighting lamps, electric buzzer, bell etc. set into operation when the corresponding spring-fitted key, space bar, or error-indicating stepped surface, respectively, is struck down, or are made movable, or possess a movable part of surface, and are connected with the corresponding spring-fitted key, space bar, or error-indicating stepped surface, respectively, by means of operating levers, or by means of any other suitable mechanical operating members.

An embodiment, shown by way of example, of the invention is represented on the annexed drawing, on which:

Fig. 1 is a side elevation of an electrically operated training typewriter,

Fig. 2 is a plan view of the training typewriter,

Fig. 3 is a plan view of the sign-board, tilted into the horizontal position;

Fig. 4 is a section along line A—B of Fig. 2, drawn to a greater scale,

Fig. 5 is a section along line C—D of Fig. 3, drawn to a greater scale, and

Figure 6:
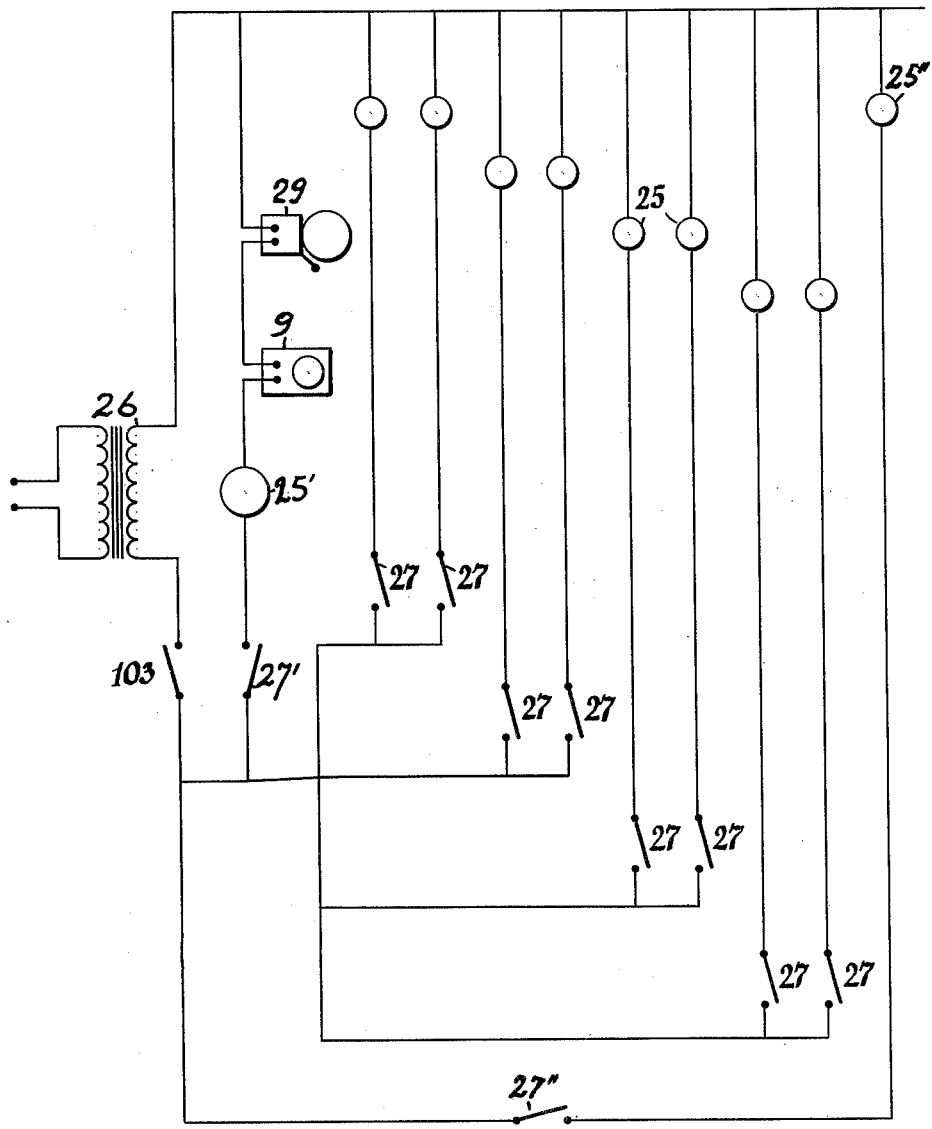
Fig. 6 is a wiring diagram of the typewriter.

On the drawing, 1 denotes the typewriter frame fashioned so as to be similar to the exterior shape of a normal typewriter, 2 denotes the keyboard, fitted with springs, of the said frame, which key-board corresponds on the whole, as to the mutual distance between keys, the height of keys, and the power required for striking down the keys, to the usual kind of typewriter key-board, but is devoid of all signs. The impact surface of the keys is preferably made concave. The upper end of the coil spring 5 surrounding the key is fastened to the key, while its lower end is supported on the frame 13, so that when the key is struck down, the spring is compressed, following which it drives the key back into its original position. In the space between the keys, the stepped key-board plate 3 having an impact surface is arranged, in such a manner as to ensure that in case of a stroke going astray to the right or left of the key which it was intended to strike, the finger slipping off from the key should certainly set the keyboard plate into operation. This stepped keyboard plate 3 is fitted, on both sides, with arm extensions 4, which are pivoted at the point 6 to the extension piece 14 of the body frame 1, so that the keyboard plate 3 will, when an impact is exercised on it, become deflected as a one-arm lever around the pivots 6. The arm extensions 4 of the step are standing under the action of the springs 7, which, when the step is struck down, become tensioned, and will, following this, return the impact means into its original position.

On the rear part of the typewriter, in the place where, on a normal typewriter, the platen is situated, the sign-board 8 is located, preferably so as to be capable of being tilted into an oblique upright plane, and so as to keep it permanently before the eyes of the person training himself or herself in the art of typing. It is on this sign-board that the system of letters and signs 15 corresponding to the key-board is arranged. In addition hereto, it is equipped with the sign 16 lighted by a lamp 25″ indicating the striking of the space bar and with two special error signs 17, which latter indicate very clearly and impressively the strokes going astray, i. e. the cases in which the finger of the pupil did not strike the key, but the error step 3. For counting the errors, the counting mechanism 9 is provided, the deflecting lever of which is operated by the lever 11 fitted with a rotation axle 10. The other arm 12 of this lever projects below the frame 18 of the error step 3, so that when the step is struck down, the frame will cause the lever to be deflected around its axle of rotation 10, in consequence whereof the lever 11 will operate the counting mechanism 9.

A contact 27' connected to the lamps 25' of the error signs 17 is also actuated by lever 11.

For striking down the interval between words there serves the space bar 19, the arm extensions 20 of which are, at the point 21, pivoted to the frame part 22 of the body. The arms 20 are standing under the action of the spring 23, the tensional force of which will cause the space bar, tilted down around the pivots 21 when struck down, to return into its original position.

In the embodiment shown on the drawing, the letters and signs provided on the sign-board 8 are standing in connection with an optical indicating device, but it is of course also possible to design the device in such a manner as to make these signs movable, and have them operated from the key-board by means of mechanical operating members, e. g. levers etc., without thereby transcending the scope of the invention.

In the embodiment shown on the drawing, the sign-board 8 forms the front plate of the illumination casing 24, the signs being arranged on translucent glass inserts on this plate. Behind each sign, an electric lamp 25 is mounted in such a manner as to ensure that no light should filter through from one sign to any other sign. The source of current of the lamps is constituted by a dry-cell corresponding to the voltage of the lamps, or by current from the city mains, in which latter case an intermediate transformer 26 is provided for producing the required voltage. Each lamp is connected into a separate circuit, the said circuits being closed in a known manner by spring-fitted contacts 27 which come into operation and make contact with the metal plate plate 28 when the keys 2, or the error step 3, or the space bar 19, respectively, are struck down. For indicating the erroneous strokes there is provided, moreover, the electric buzzer or bell 29, the circuit 30 of which is likewise closed by the contact 27' coming into operation when the error step is struck down. Instead of an electric bell, it is, of course, also possible to employ a mechanical indicating bell, which is operated from the error step by means of a suitable lever transmission mechanism.

The parts of mechanism described are arranged in the body frame 1, which is similar to the frame of a normal typewriter, and can be closed by means of a lid.

Fig. 6, shows a complete wiring diagram of the training typewriter. A transformer 26 supplies low voltage current to the device. After closing the main switch 103 the typewriter is ready for use. When one of the keys 2 is engaged, the corresponding switch 27 will be closed, and the lamp 25 connected thereto will illuminate the corresponding letter 15 of the sign board. When the space key 19 is struck, the contact 27'' is closed and the lamp 25'' illuminates the corresponding sign 16 on the sign board 8. If the key-board plate is struck on account of an error, contact 27' is closed and the lamp 25' illuminates the error sign 17, the counting mechanism 9 is actuated, and the buzzer 29 gives an acoustic signal.

When putting the training typewriter into use, the casing 1 is opened, and the illumination casing 24 is brought into the desired oblique upright position (Fig. 1), following which the corresponding source of current is switched on. During typing practice, the pupil will not look at the keyboard, since no signs of any kind are provided on the same, but will only lock at the front plate 8 of the illumination casing. When the keys 2 are struck down, the contacts 27, 28 will close the circuit of the electric lamp of the sign 15 belonging to the key concerned, the lamp will light up and by illuminating the sign will supply information to the pupil as to whether he or she has struck down the right key. In case of a stroke going astray to the right of left of the key it was intended to strike, it is the error step 3 that is struck down, and the electric lamp of the circuit thus becoming closed lights the—preferably red-coloured—error sign 17 on the sign-board 8. At the same time the buzzer or bell 29 is also set into operation, which gives an acoustical indication of the error committed. The counting of the errors is performed by the counting mechanism 9, which is operated by the levers 11, 12, when the error step 3 is struck down. If the pupil strikes down the space bar 19, it is the electric lamp arranged behind the word-interval sign 16 on the sign-board 8 that is lit up, and thus it is the word interval sign that will be illuminated.

The invention not only offers the advantage of enabling so-called "blind-typing" to be easily learned, but also the further advantage consisting in that the training typewriter can be manufactured at much lower cost than a normal typewriter, and can therefore be acquired by the pupil much more easily.

What I claim is:

1. As an educational device a typewriter for training purposes comprising a plurality of keys constituting a key board; movable impact means distinct from said keys and surrounding the same; indicating means; and an actuating connection between said impact means and said indicating means whereby the latter are actuated upon movement of the former so as to indicate when the fingers of the student strike the impact means instead of the keys.

2. As an educational device a typewriter for training purposes comprising a frame; a plurality of keys mounted in said frame and constituting a keyboard; impact means distinct from said keys, formed through said keyboard at a level below the tips of said keys and mounted in said frame for movement in a generally vertical direction; indicating means; and an actuating connection between said impact means and said indicating means whereby the latter are actuated upon movement of the former so as to indicate when the fingers of the student strike the impact means instead of the keys.

3. As an educational device a typewriter for training purposes comprising a frame; a plurality of keys mounted in said frame and constituting a stepped keyboard; a stepped keyboard plate disposed at a level below the tips of said keys and mounted in said frame for movement in a generally vertical direction; indicating means; and an actuating connection between said stepped keyboard plate and said indicating means whereby the latter are actuated upon movement of the former so as to indicate when the fingers of the student strike the stepped keyboard plate instead of the keys.

4. As an educational device a typewriter for training purposes comprising a plurality of keys constituting a key board; movable impact means distinct from said keys and surrounding the same;

indicating means; an actuating connection between said impact means and said indicating means whereby the latter are actuated upon movement of the former so as to indicate when the fingers of the student strike the impact means instead of the keys; and resilient means for returning said impact means to their original position.

5. As an educational device a typewriter for training purposes comprising a plurality of keys constituting a key board; movable impact means distinct from said keys and surrounding the same; lever means operatively connected to said impact means; and a counting device operable by said lever means for registering the incidence of striking of said impact means by the student.

6. As an educational device a typewriter for training purposes comprising a plurality of keys constituting a key board; movable impact means distinct from said keys and surrounding the same; indicating means; an actuating connection between said impact means and said indicating means whereby the latter are actuated upon movement of the former so as to indicate when the fingers of the student strike the impact means instead of the keys; lever means operatively connected to said impact means; and a counting device operable by said lever means for registering the incidence of striking of said impact means by the student.

7. As an educational device a typewriter for training purposes comprising a plurality of keys constituting a key board; movable impact means distinct from said keys and surrounding the same; an electric sign board provided with a plurality of electrically operated signs; circuit means connecting said signs to individual keys to be actuated by depression of the latter; an electrically operated error sign on said signboard distinct from said key-connected signs; circuit means connecting said impact means and said error sign; and switch means interposed in the circuit of said error sign for actuation by movement of said impact means so that distinct signs indicate the striking of individual keys by the student and the striking of said impact means.

8. As an educational device a typewriter for training purposes comprising a plurality of keys constituting a key board; movable impact means distinct from said keys and surrounding the same; a sound device; and an actuating connection between said impact means and said sound device whereby the latter is actuated upon movement of the former so as to indicate when the fingers of the student strike the impact means instead of the keys.

9. A typewriter constructed in accordance with claim 7, and including a sound device; and an actuating connection between said impact means and said sound device whereby the latter is actuated upon movement of the former so as to give an additional indication when the fingers of the student have struck the impact means instead of the keys.

LÁSZLÓ ANDOR GECSEI.

REFERENCES CITED

The following references are of record in the file of this patent:

UNITED STATES PATENTS

| Number | Name | Date |
| --- | --- | --- |
| 1,469,750 | Yelf | Oct. 2, 1923 |
| 1,984,599 | Safar | Dec. 18, 1934 |
| 2,045,021 | Muller | June 26, 1936 |
| 2,109,442 | Brownjohn | Feb. 22, 1938 |
| 2,154,478 | Smith | Apr. 18, 1939 |
| 2,159,491 | Rose | May 23, 1939 |